United States Patent
Nagasaka

(10) Patent No.: US 7,108,432 B2
(45) Date of Patent: Sep. 19, 2006

(54) CONNECTION STRUCTURE FOR OPTICAL DEVICE, OPTICAL DEVICE AND ELECTRONIC DEVICE

(75) Inventor: Kimio Nagasaka, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/231,877

(22) Filed: Sep. 22, 2005

(65) Prior Publication Data
US 2006/0104576 A1 May 18, 2006

(30) Foreign Application Priority Data
Nov. 12, 2004 (JP) ............................. 2004-329041

(51) Int. Cl.
*G02B 6/10* (2006.01)
*G02B 6/30* (2006.01)
*G02B 6/36* (2006.01)

(52) U.S. Cl. ........................... 385/89; 385/49; 385/53; 385/88; 385/90; 385/91; 385/92; 385/93; 385/94; 385/129

(58) Field of Classification Search ............ 385/88–94, 385/49, 53, 129
See application file for complete search history.

(56) References Cited

U.S. PATENT DOCUMENTS 6,086,263 A * 7/2000 Selli et al. ...................... 385/88

2004/0202477 A1 10/2004 Nagasaka et al.
2005/0238294 A1 10/2005 Nagasaka et al.

FOREIGN PATENT DOCUMENTS

| JP | A 2004-246279 | 9/2004 |
| JP | A 2005-315902 | 11/2005 |

* cited by examiner

*Primary Examiner*—Brian Healy
*Assistant Examiner*—Jerry Martin Blevins
(74) *Attorney, Agent, or Firm*—Oliff & Berridge, PLC

(57) ABSTRACT

To provide an optical device that can be made thinner. A connection structure for an optical device including a plug provided at one end of an optical transmission medium wherein the plug is attached to a receptacle to thereby achieve an optical coupling between the one end of the optical transmission medium and a specified optical element, wherein the plug (2) is equipped with a protruded section (20) extending near a center and along a longitudinal direction of the optical transmission medium (3), and cut sections (21) provided on both sides of the protruded section, and the receptacle (1) is equipped with a substrate (10) having one surface side on which the plug is mounted, a first positioning member (15) that is provided on the one surface side of the substrate, exposes the protruded section and abuts against the cut sections of the plug for positioning the plug in a thickness direction thereof, and a second positioning member (11) that is provided on the one surface side of the substrate, and abuts against side sections of the plug for positioning the plug in a direction orthogonal to the thickness direction of the plug and the longitudinal direction of the optical transmission medium, respectively.

14 Claims, 8 Drawing Sheets

CONNECTION STRUCTURE FOR OPTICAL DEVICE, OPTICAL DEVICE AND ELECTRONIC DEVICE

This nonprovisional application claims the benefit of Japanese Patent Application No. 2004-329041, filed Nov. 12, 2004. The entire disclosure of the prior applications is hereby incorporated by reference herein in its entirety.

BACKGROUND

The present invention relates to optical devices used for data communications that use light.

For performing optical communications, it is important to provide a structure with which mutual positioning of connecting points that are present on a transmission path of optical signals, such as, for example, between optical fibers, between an optical fiber and a light emitting element or a light receiving element, and the like, can be accurately made. In this respect, Japanese Laid-open Patent Application 2004-246279 (Patent Document 1) describes an optical module that uses a structure for achieving an optical coupling through changing a traveling path of optical signals emitted from one end of an optical transmission medium or optical signals emitted from an optical element.

For mounting optical transceivers described above on a variety of electronic apparatuses, there are even greater demands on miniaturization of the optical transceivers. Such demands are apparent particularly in small sized portable apparatuses such as notebook type personal computers, cellular phones and the like, and in particular, demands on size reduction of these apparatuses with respect to their height (thickness) direction are strong. To cope with them, because the optical device described in the aforementioned prior art document uses a structure, for positioning an optical transmission medium and a light emitting element, in which a plug is provided at one end of the optical transmission medium and the plug is inserted in and surrounded by a coupling hole, it is not enough in view of providing thinner apparatuses, and more improved technologies are desired.

[Patent Document 1] Japanese Laid-open Patent Application 2004-246279

SUMMARY

Thus, it is an object of the present invention to provide a technology that can make optical devices thinner.

The present invention in accordance with a first embodiment pertains to a connection structure for an optical device including a plug provided at one end of an optical transmission medium wherein the plug is attached to a receptacle to thereby achieve an optical coupling between the one end of the optical transmission medium and a specified optical element, wherein: the plug is equipped with a protruded section extending near a center and along a longitudinal direction of the optical transmission medium, and cut sections provided on both sides of the protruded section, and the receptacle is equipped with a substrate having one surface side on which the plug is mounted, a first positioning member that is provided on the one surface side of the substrate, exposes the protruded section and abuts against the cut sections of the plug for positioning the plug in a thickness direction thereof, and a second positioning member that is provided on the one surface side of the substrate, and abuts against side sections of the plug for positioning the plug in a direction orthogonal to the thickness direction of the plug and the longitudinal direction of the optical transmission medium, respectively.

It is noted here that the "optical element" is for transmitting and receiving optical signals to and from the optical transmission medium, and may include, for example, a light emitting element that outputs optical signals, a light receiving element that receives optical signals and coverts the same to electrical signals, and the like. Also, the "optical element" may be an optical transmission medium. In other words, the case where an optical transmission medium on one side and an optical transmission medium on the other side are optically connected at a predetermined position can be included in the applicable range of the present invention.

In the structure described above, the cut sections are provided in the plug adjacent to its side surfaces at a step lower than its center, and the first positioning member is structured to abut against the cut sections in a manner that the higher protruded section is exposed. By this, compared to the case where the structure that surrounds a plug is adopted, the height of the plug in its thickness direction can be considerably reduced, and therefore the optical device can made thinner.

Preferably, the plug may support the one end of the optical transmission medium within a thickness range thereof including the protruded section.

The optical transmission medium can be more securely supported without having to increase the overall thickness because it is supported by using a relatively thick portion.

Preferably, the first positioning member of the receptacle may be formed from a plate member provided in a manner to cover the cut sections.

By this, the optical device can be made much thinner.

Moreover, the plate member may preferably be formed from an elastic body to cause a force that pushes the plug in the thickness direction thereof.

By this, the positioning accuracy of the plug can be improved, and the positioning stability of the plug can be improved.

Preferably, the receptacle may include a housing member having an opening that exposes the protruded section of the plug, wherein an edge section of the opening and a nearby section thereof of the housing member may concurrently serve as the first positioning member.

By this, the number of parts can be reduced, and the optical device can be made thinner with a simplified structure.

Also, the second positioning member may preferably have an abutting surface against the side sections of the plug, and have generally the same thickness as that of the plug, and the first positioning member may preferably be formed in one piece with the second positioning member as a protruded section disposed on an upper side of the abutting surface of the second positioning member.

By this, the number of parts can also be reduced, and the optical device can also be made thinner with a simplified structure.

Preferably, the receptacle may be provided on the one surface side of the substrate, and may further be equipped with a reflection section that changes a traveling path of an optical signal outputted from one end of the optical transmission medium by about 90 degrees to be conducted to the optical element, or that changes a traveling path of an optical signal outputted from the optical element by about 90 degrees to be conducted to the one end of the optical transmission medium.

By this, an optical device of the type that changes the traveling path of an optical signal emitted from an optical transmission medium by about 90 degrees to be conducted to a predetermined optical element can be made much thinner.

Preferably, the substrate of the receptacle may have transparency, and the optical element may be disposed on another surface side of the substrate, wherein the optical signal travels from the reflection section, passing through the substrate, to the optical element, or travels from the optical element, passing through the substrate, to the reflection section.

By this, an optical device of the type that transmits and receives optical signals through a transparent substrate can be made much thinner.

Also, the connection structure may preferably further include a third positioning member that has transparency, and abuts against a tip section of the plug to position the plug in the longitudinal direction of the optical transmission medium, wherein the reflection section may preferably be formed in one piece with the third positioning member by cutting a portion of the third positioning member.

By this, the structure can be simplified.

Preferably, the optical element may be an optical device that emits the optical signal, or outputs an electrical signal according to an intensity of the optical signal that enters.

By this, an optical device that performs data communications using optical signals can be made much thinner.

The invention in accordance with a second embodiment pertains to a receptacle that is provided at one end of an optical transmission medium and is attached to an optical plug equipped with a protruded section extending near a center thereof and along a longitudinal direction of the optical transmission medium and cut sections provided on both sides of the protruded section, respectively, and is used for achieving together with the optical plug an optical coupling between one end of the optical transmission medium and a predetermined optical element, and is equipped with: a substrate having one surface side on which the plug is mounted; a first positioning member that is provided on the one surface side of the substrate, exposes the protruded section and abuts against the cut sections of the plug for positioning the plug in a thickness direction thereof, and a second positioning member that is provided on the one surface side of the substrate, and abuts against side sections of the plug for positioning the plug in a direction orthogonal to the thickness direction of the plug and the longitudinal direction of the optical transmission medium, respectively.

In the structure described above, when the cut sections are provided in the plug adjacent to its side surfaces at a step lower than its center, the first positioning member is structured to abut against the cut sections in a manner that the higher protruded section is exposed. By using such a receptacle, the optical device can made thinner, compared to the case where the structure that surrounds a plug is adopted.

The invention in accordance with a third embodiment pertains to an optical device equipped with the connection structure described above. It is noted here that the "optical device" is, for example, an optical communications apparatus (optical transceiver) and the like. Such an optical communications apparatus can be used for a variety of electronic apparatuses, such as, for example, personal computers, so-called PDAs (potable data terminal devices), and the like which perform data communications with external apparatuses using light as a transmission medium. It is noted here that the "optical communications apparatus" includes not only an apparatus that includes both of a structure concerning transmission of signal light (a light emitting element or the like) and a structure concerning reception of signal light (a light receiving element or the like), but also an apparatus equipped only with a structure concerning transmission (a so-called optical transmission module) or an apparatus equipped only with a structure concerning reception (a so-called optical reception module).

By using the optical device in accordance with the present invention, the apparatus can be made thinner.

The invention in accordance with a fourth embodiment pertains to an electronic device provided with the optical device described above. It is noted here that the "electronic device" refers to devices in general that realize specified functions using electronic circuits or the like, and is not particularly limited to a specific structure, and may include a variety of devices, such as, for example, personal computers, PDAs (potable data terminals), electronic notebooks and the like. The optical device in accordance with the present invention can be used in these electronic devices for data communications within the devices or with external devices and the like.

By using the optical device in accordance with the present invention, the electronic device can be made thinner.

DETAILED DESCRIPTION OF EMBODIMENTS

Embodiments of the present invention are described below with reference to the accompanying drawings.

<First Embodiment>

Figure 1:
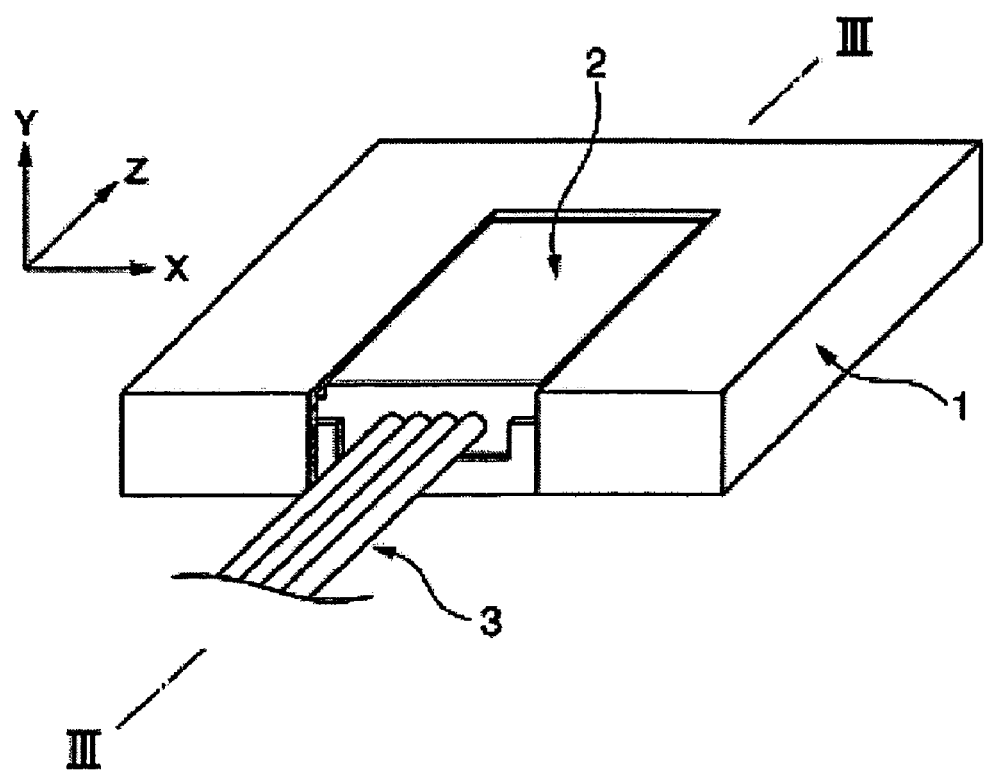
FIG. 1 is a view (perspective view) for describing a general structure of an optical device in accordance with a first embodiment.

FIG. 1 is a view (perspective view) for describing a general structure of an optical device in accordance with a first embodiment. As shown in FIG. 1, by providing a plug 2 at an end section of an optical fiber (optical transmission medium) 3 and attaching the plug 2 to a receptacle 1, the optical device in accordance with the present embodiment achieves an optical coupling between one end of the optical fiber 3 and a predetermined optical element. Here, in the present embodiment, as the "optical element," an optical device that outputs an optical signal or outputs an electrical signal according to the intensity of an inputted optical signal is considered.

Figure 2:
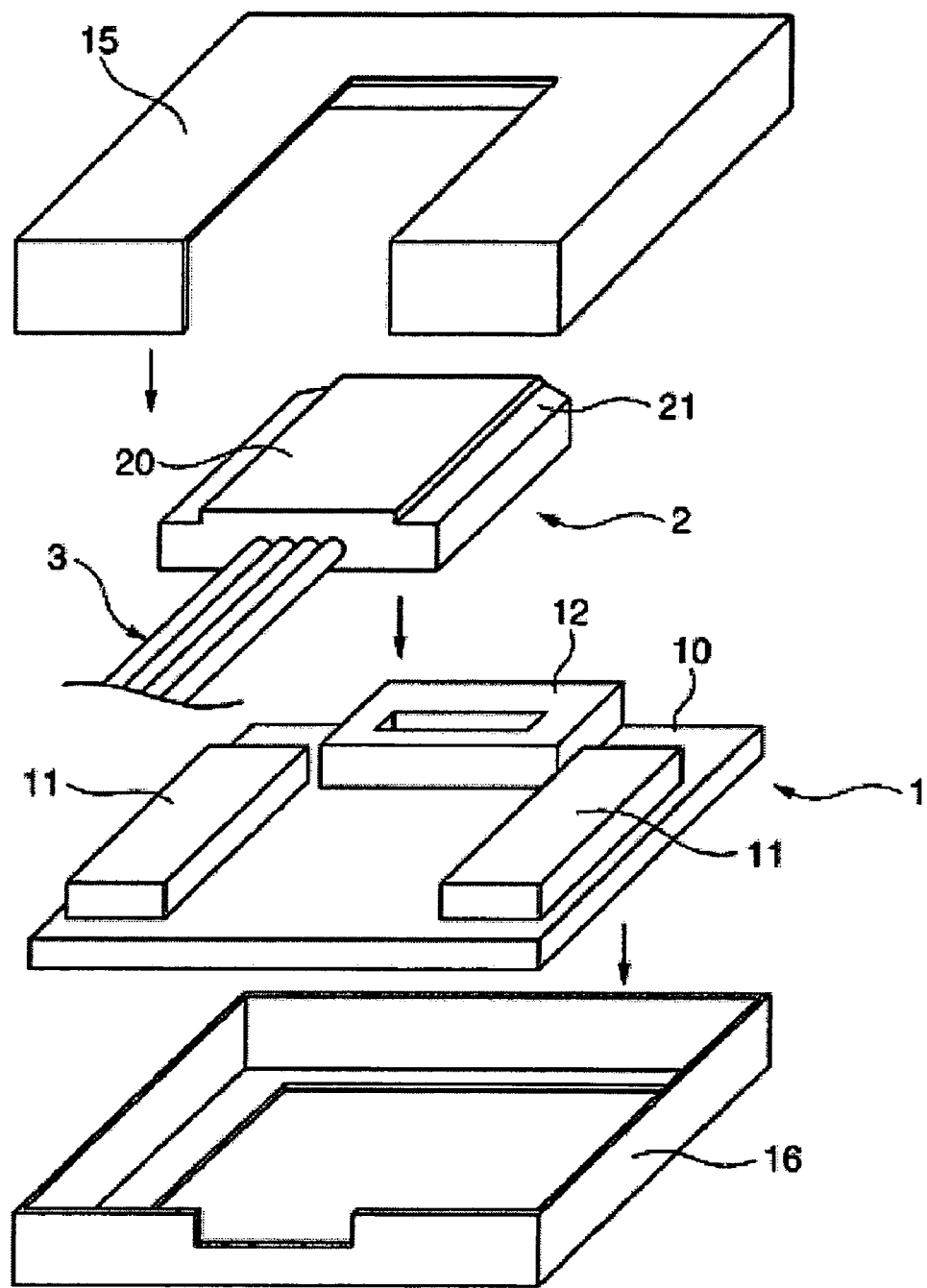
FIG. 2 is an exploded perspective view of the optical device shown in FIG. 1.
Figure 3:
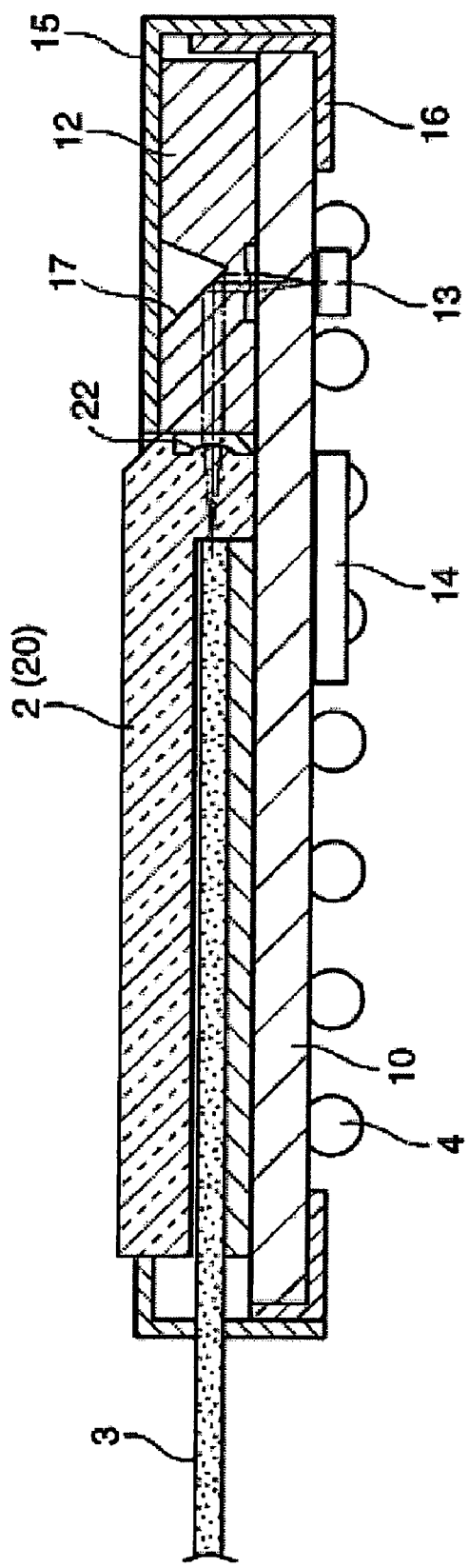
FIG. 3 is a cross-sectional view of the optical device shown in FIG. 1 taken along a line III—III.

FIG. 2 is an exploded perspective view of the optical device shown in FIG. 1. FIG. 3 is a cross-sectional view of the optical device shown in FIG. 1 taken along a line III—III. The structure of the optical device in accordance with the present embodiment is described below in detail with reference to these drawings.

The plug 2 is provided at one end side of the optical fiber 3 in a manner to pinch the fiber core therein, and includes a protruded section 20, cut sections 21 that are disposed on both sides of the protruded section 20 and function as a positioning guide, and a lens array 22. The plug 2 may be formed from, for example plastic material or the like.

The protruded section 20 extends near the center along the longitudinal direction (Z direction indicated in FIG. 1) of the optical fiber 3. The plug 2 in accordance with the present embodiment is formed in a manner to support one end of the optical fiber 3 within its thickness range including the protruded section 20. In this manner, by using the relatively thick portion, the optical fiber 3 can be securely supported without having to increase the overall thickness of the plug 2. It is noted here that if an injection molding method is used to manufacture the plug 2 at low cost, the moldability (precision of the shape or the like) would likely be lowered because the plug 2 of the present embodiment is thin. However, in the plug 2 of the present embodiment, an area thereof including the protruded section 20 is thick, and the area can be secured as a main resin flow path at the time of injection molding, such that the moldability can be improved. It is noted that the method for manufacturing the plug 2 is not limited to an injection molding method, and another method may be used.

The cut sections 21 are provided on both sides of the protruded section 20, respectively, and used for positioning the plug 2 in its thickness direction (Y direction indicated in FIG. 1). More concretely, as shown in FIG. 2, the cut sections 21 have upward surfaces, and the upward surfaces abut against an upper housing member 15 (to be described in detail) of the receptacle 1, whereby the plug 2 is positioned in the Y direction. In this manner, the surfaces that position the plug 2 in the Y direction are disposed near side surfaces of the plug 2, and formed at a step lower than the center area of the plug 2, such that an increase in the height (thickness) that might be caused by the upper housing member 15 can be avoided, and the overall height of the optical device can be reduced.

Figure 4:
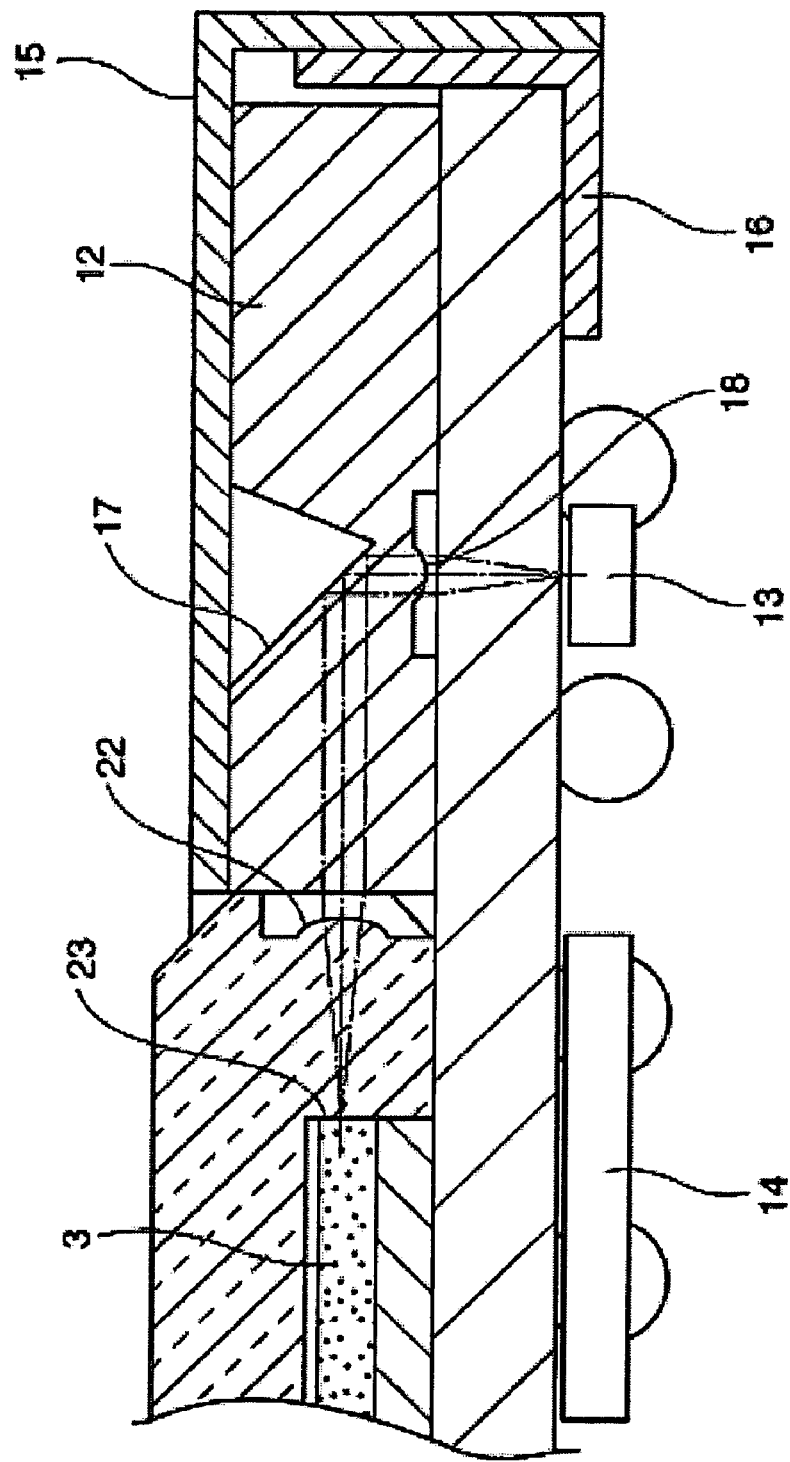
FIG. 4 is a partially enlarged cross-sectional view of the optical device shown in FIG. 3.

The lens array 22 is provided on the side of a tip of the plug 2, and serves to focus an optical signal emitted from the optical fiber 3 to be led to a reflection section 17, or to focus an optical signal, which is emitted from the optical element 13 and changed in its traveling path by the reflection section 17, to be led to an end face of the optical fiber 3 (see FIG. 3 and FIG. 4). As shown in FIG. 4, the plug 2 is formed with a surface (abutting surface) 23 at a position corresponding to the focal point of the lens array 22 for abutting the end face of the optical fiber 3, and a plurality of V grooves (V groove array) formed toward the rear end side of the abutting surface 23. The optical fiber 3 is laid along the V grooves and fixed and bonded thereto, whereby the end face of the optical fiber 3 is positioned. It is noted that, if necessary, the optical fiber 3 may be pressed by a fiber covering plate, and bonded.

The receptacle 1 includes a substrate 10, guide blocks 11, an optical block 12, the optical element 13, a circuit chip 14, the upper housing member 15, a lower housing member 16, the reflection section 17, and a lens array 18.

The substrate 10 has one surface on which the plug 2 is mounted, and positions, together with the upper housing member 15, the plug 2 in its thickness direction (Y direction). Also, the substrate 10 in accordance with the present embodiment functions to support the guide blocks 11 and the optical block 12 on one surface thereof. The substrate 10 is formed from, for example, glass, plastic material or the like. Further, in accordance with the present embodiment, since the optical element 13 is disposed on the other surface side of the substrate 10, and the optical fiber 3 and the reflection section 17 are disposed on the one surface side, the substrate 10 is present on the traveling path of optical signals, such that a substrate having transparency is used as the substrate 10.

The guide blocks 11 (second positioning member) are provided on the one surface of the substrate 10, and abut against side sections of the plug 2 to function to position the plug 2 in its width direction (X direction indicated in FIG. 1), in other words, in a direction orthogonal to the thickness direction of the plug 2 and the longitudinal direction of the optical fiber 3, respectively. The guide blocks 11 may preferably be composed of a material that has a coefficient of thermal expansion generally equal to or similar to that of the substrate 10, and also achieves good adhesion with the substrate 10. Such conditions can be realized by, for example, forming the guide blocks 11 with the same material as the constituting material of the substrate 10.

The optical block 12 (third positioning member) is composed of a transparent material, and abuts against the tip section of the plug 2 to function to position the plug 2 in the longitudinal direction (Z direction indicated in FIG. 1) of the optical fiber 3.

The optical element 13 is disposed on the other surface side of the substrate 10, is electrically connected to an electrical wiring (its illustration omitted) formed on the other surface of the substrate 10, and emits an optical signal according to a drive signal applied through the electrical wiring from the circuit chip 14 or outputs an electrical signal according to the intensity of an entering optical signal. Here, concrete examples of the optical element 13 may differ depending on whether the optical device is used on a data transmission side or on a data receiving side. When the optical device 1 is used on the data transmission side, a light-emitting element such as a VCSEL (surface-emitting laser) is used as the optical element 13. When the optical device 1 is used on the data receiving side, a light receiving element such as a photodiode is used as the optical element 13. Also, as illustrated in FIG. 3 and FIG. 4, the electrical wiring on the other surface of the substrate 10 is electrically connected to another circuit substrate (mother board) through solder balls 4. In other words, in the present embodiment, a BGA (ball grid array) package is used as a mounting method. However, the mounting method is not limited to this method.

The circuit chip 14 is disposed on the other surface side of the substrate 10, and is electrically connected to the electrical wiring formed on the other surface of the substrate 10. When the optical element 13 is a light-emitting element, an element that includes a driver for supplying driving signals to the optical element 13 is used as the circuit chip 14. When the optical element 13 is a light receiving element, an element that includes a receiver amplifier for amplifying output signals from the optical element 13 is used.

The upper housing member 15 together with the lower housing member 16 houses components of the receptacle 1, and has an opening that exposes the protruded section 20 of the plug 2. When the upper housing member 15 is fixed to the lower housing member 16, an edge section of the opening and its neighboring area abut against the cut sections 21 of the plug 2, whereby the function to position the plug 2 in its thickness direction (Y direction) is realized. In other words, the upper housing member 15 also functions as a first positioning member that exposes the protruded section 20 of the plug 2 and abuts against the cut sections 21 to thereby position the plug 2. Also, the upper housing member 15 in accordance with the present embodiment is formed with an elastic plate member (for example, a metal plate spring or the like), and it is formed such that the edge section of the opening and its neighboring area of the upper housing member 15 cover the cut sections 21, when the respective members are assembled. In this instance, the elastic force of the upper housing member 15 causes a force (a pressure force) to push the plug 2 in its thickness direction, whereby the plug 2 is positioned in the Y direction.

The lower housing member 16 together with the upper housing member 15 houses the components of the receptacle 1, and has an opening that exposes the other surface of the substrate 10. A core module composed of the substrate 10, the guide blocks 11, the optical block 12 and the like is embedded in the lower housing member 16, and bonded thereto with adhesive, solder or the like. Normally, the assembly is conducted in the following manner: the core module in a stage in which it is attached to the lower housing member 16 is mounted on a mother board or the like, then the plug 2 is inserted inside the guide blocks 11 and the optical block 12, and then the upper housing member 15 is placed thereon.

The reflection section 17 is provided on one surface side of the substrate 10, and functions to change a traveling path of an optical signal outputted from one end of the optical fiber 3 by about 90 degrees to be conducted to the optical element 13, or to change a traveling path of an optical signal outputted from the optical element 13 by about 90 degrees to be conducted to one end of the optical fiber 3. In the present embodiment, as shown in FIG. 3, by cutting a portion of the optical block 12 to define a reflection surface angled at about 45 degrees with respect to the X-Z plane, the reflection section 17 is formed in one piece with the optical block 12. Also, by forming the optical block 12 with a transparent material, an optical signal is passed through the optical block 12, and reflected by the reflection section 17. Therefore, in accordance with the present embodiment, an optical signal outputted from the optical fiber 3 travels from the reflection section 17, passing through the substrate 10, to the optical element 13, or an optical signal travels from the optical element 13, passing through the substrate 10, to the reflection section 17. The reflection section 17 can be realized by appropriately selecting a material that composes the optical block 12 to set the difference in refractive index between the optical block 12 and its surrounding gas (air or the like) to a condition in which incident light has a total reflection (or a condition close thereto).

The lens 18 is disposed on a traveling path of an optical signal between the reflection section 17 and the optical element 13, and has a function to focus a light signal outputted from an end face of the optical fiber 3 and reflected by the reflection section 17 to be conducted to the optical element 13, or focus a light signal outputted from the optical element 13 to form a generally parallel light. In the present embodiment, the lens 18 is provided in one piece with the optical block 12. More concretely, a concave section is provided at a predetermined position in the optical block 12, and the lens 18 is formed inside the concave section.

<Second Embodiment>

Figure 5:
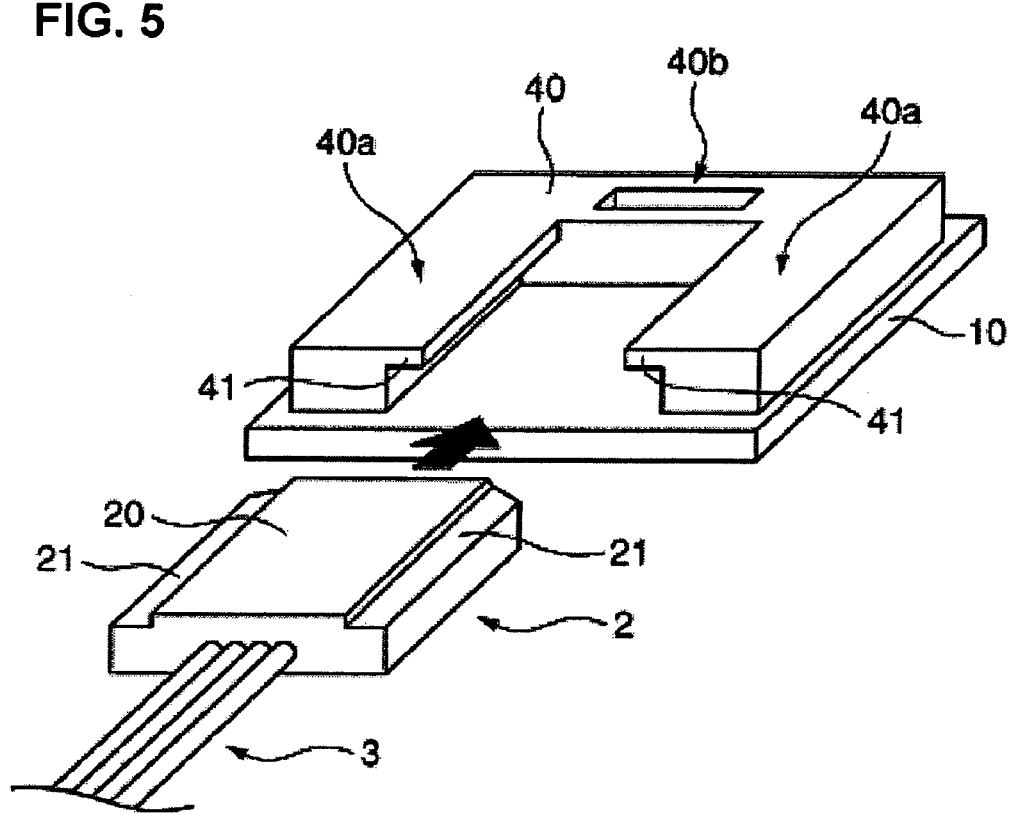
FIG. 5 is a view (perspective view) for describing a general structure of an optical device in accordance with a second embodiment.

FIG. 5 is a view (perspective view) for describing a general structure of an optical device in accordance with a second embodiment. The optical device of the second embodiment shown in FIG. 5 has a structure that is basically similar to that of the optical device of the first embodiment described above, and is mainly different in that guide blocks and an optical block are formed in one piece, and their shape is devised so as to cancel a housing member. The difference is mainly focused and described below.

As shown in FIG. 5, an optical/guide block 40 is formed in a generally U shape by combining the guide blocks 11 and the optical block 12 of the first embodiment described above in one piece. More specifically, the optical/guide block 40 is equipped with guide sections 40a that have the same functions as those of the guide blocks 11 in the first embodiment (in other words, as the second positioning member), and an optical section 40b that has the same functions as those of the optical block 12 (in other words, as the third positioning member). The guide sections 40a of the present embodiment have surfaces that abut against side sections of the plug 2, and are formed in generally the same height as that of the plug 2. Also, protrusions 41 are formed at upper sections of the abutting surfaces of the guide sections 40a. The protrusions 41 are formed in one piece with the optical/guide block 40 as illustrated, and abut against the cut sections 21 as the plug 2 is inserted therein, thereby functioning as a first positioning member to position the plug 2 in its thickness direction. It is noted that, when the guide blocks and the optical block are formed independently from one another like the first embodiment, the guide blocks and the protrusions may be formed in one piece.

<Third Embodiment>

Figure 6:
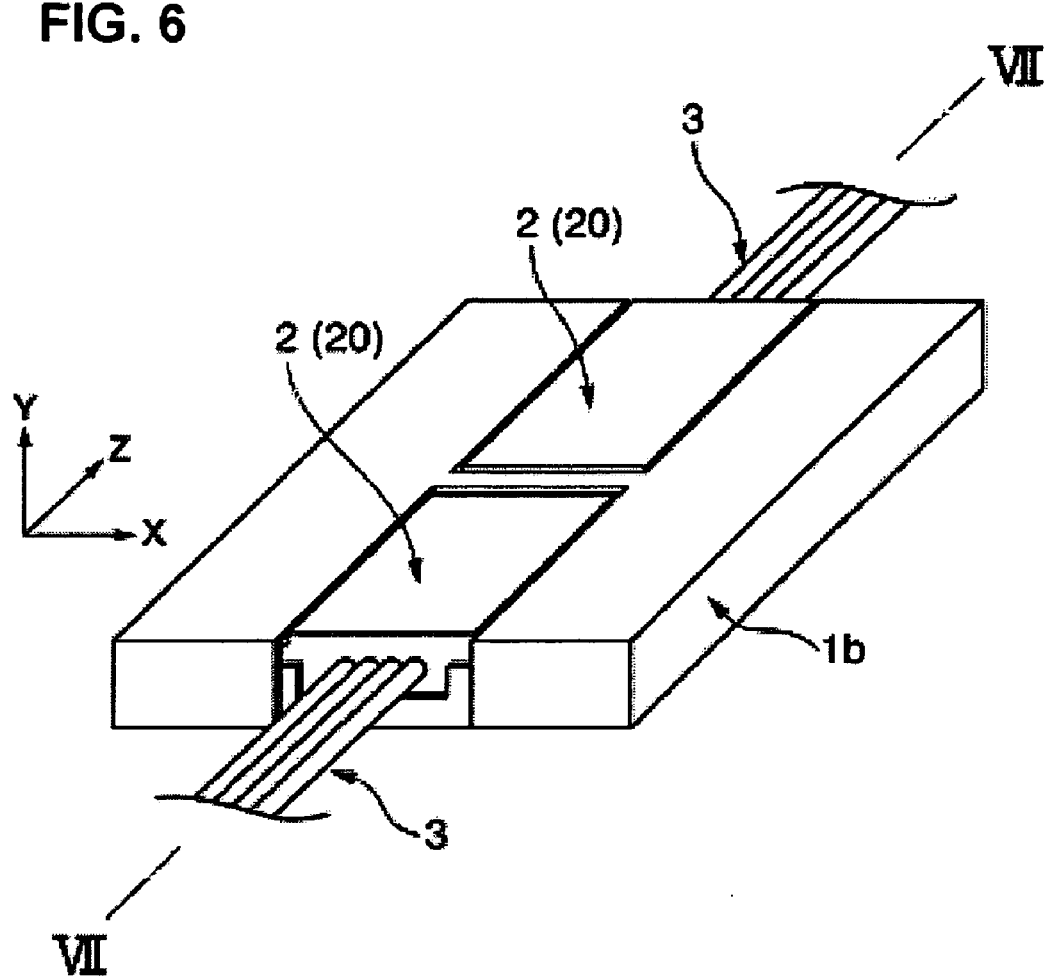
FIG. 6 is a view (perspective view) for describing a general structure of an optical device in accordance with a third embodiment.
Figure 7:
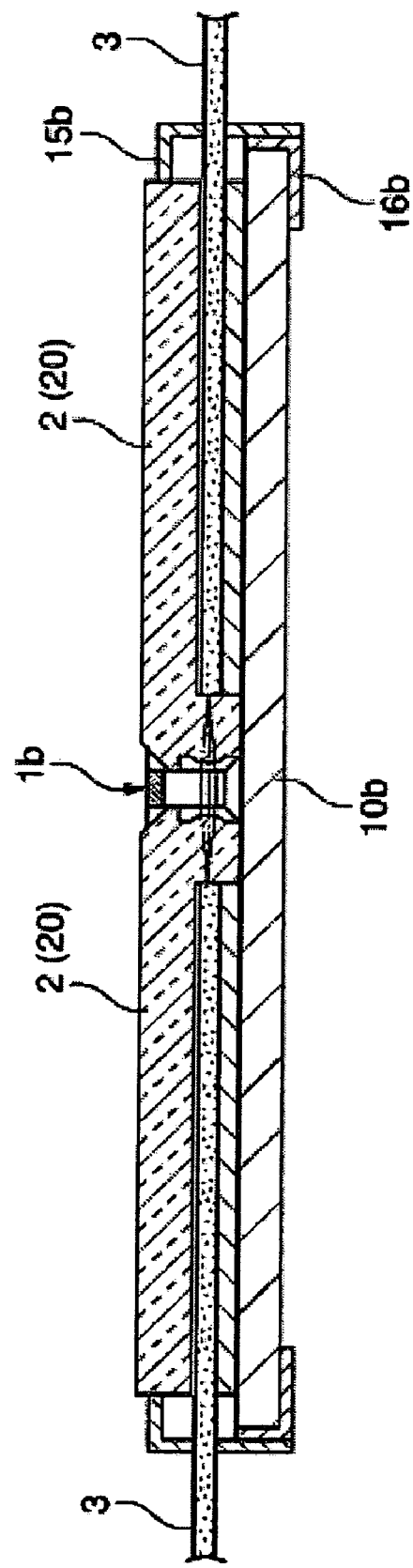
FIG. 7 is a cross-sectional view of the optical device shown in FIG. 6 taken along a line VII—VII.

FIG. 6 is a view (perspective view) for describing a general structure of an optical device in accordance with a third embodiment. FIG. 7 is a cross-sectional view of the optical device shown in FIG. 6 taken along a line VII—VII. As shown in FIG. 6 and FIG. 7, the third embodiment considers a case in which an "optical element" that is an opposing side to be optically connected to an optical fiber is also an optical fiber. In other words, the third embodiment is an embodiment in which the present invention is applied to a case where optical fibers are optically coupled together. It is noted that components similar to those of the optical device in accordance with the first embodiment are appended with the same reference numbers, and their detailed description is omitted.

As shown in FIG. 6 and FIG. 7, in accordance with the present embodiment, plugs 2 are attached to a receptacle 1b, whereby optical fibers 3 provided with the plugs 2 are disposed opposite to each other on one surface of a substrate 10b, to optically couple the optical fibers 3 to each other.

An upper housing member 15b together with a lower housing member 16b houses components of the receptacle 1b, and is formed in a generally H shape that appears to be formed by duplicating the upper housing member 15 of the first embodiment through an axis of symmetry parallel with the X axis (see FIG. 6). The upper housing member 15b is formed to expose protruded sections 20 of the respective plugs 2 through its two openings, respectively, wherein edge sections of the openings and their neighboring areas abut against the cut sections 21 of the plugs 2, whereby the plugs 2 are positioned in their thickness direction. In other words, the upper housing member 15b also functions as a first positioning member. Also, the upper housing member 15b of the present embodiment is formed with an elastic plate member (for example, a metal plate spring or the like), which causes a force that pushes the plugs 2 in their thickness direction, whereby the plugs 2 are positioned in the Y direction.

The lower housing member 16b together with the upper housing member 16a houses components of the receptacle 1b, and has an opening that exposes the other surface of the substrate 10. It is note that, although not shown, on one surface of the substrate 10b that is housed by the lower housing member 16b and the upper housing member 15b, guide blocks (second positioning member) similar to those of the first embodiment described above are provided, whereby the plugs 2 are positioned in the X direction by the guide blocks.

<Fourth Embodiment>

Figure 8:
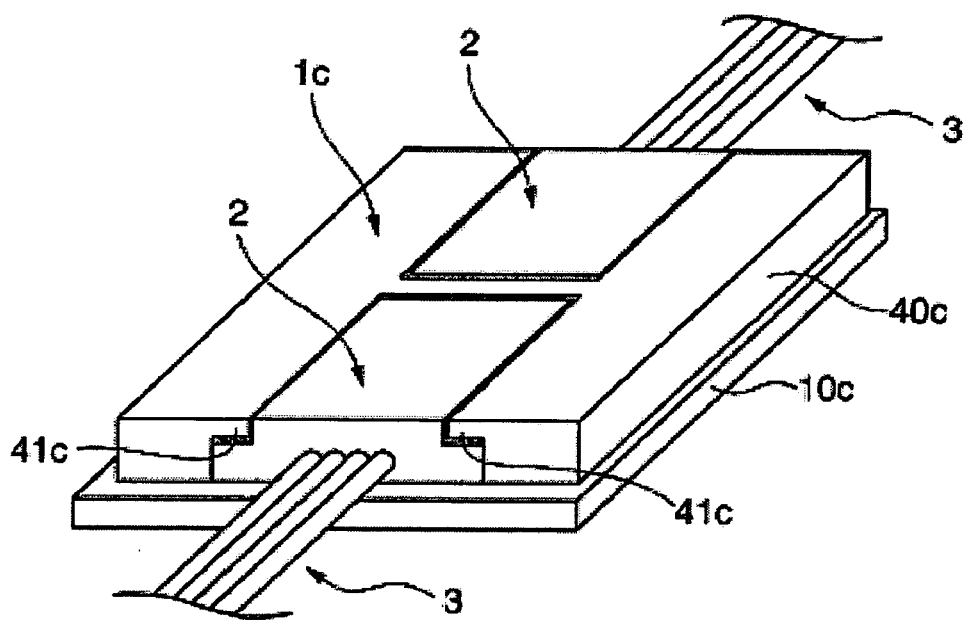
FIG. 8 is a view (perspective view) for describing a general structure of an optical device in accordance with a fourth embodiment.

FIG. 8 is a view (perspective view) for describing a general structure of an optical device in accordance with a fourth embodiment. As shown in FIG. 8, the fourth embodiment also considers a case in which an "optical element" that is an opposing side to be optically connected to an optical fiber is also an optical fiber. In other words, the fourth embodiment is an embodiment in which the present invention is applied to a case where optical fibers are optically coupled together. It is noted that components similar to those of the optical device in accordance with the first embodiment or the second embodiment are appended with the same reference numbers, and their detailed description is omitted.

As shown in FIG. 8, a receptacle 1c in accordance with the present embodiment is equipped with an optical/guide block 40c in a generally H shape that appears to be formed by duplicating the optical/guide block 40 of the second embodiment through an axis of symmetry parallel with the X axis. By attaching the plugs 2 to the receptacle 1c, optical fibers 3 provided with the plugs 2 are disposed opposite to each other on one surface of a substrate 10c, to optically couple the optical fibers 3. In the present structure, the optical/guide block 40c has transparency, and an optical signal outputted from the optical fiber 3 that is supported by one of the plugs 2 passes through the optical/guide block 40c and enters the optical fiber 3 that is supported by the other of the plugs 3. Also, the optical/guide block 40c is formed in one piece with protrusions 41c that abut against the cut sections 21 when the plugs 2 are inserted therein, to thereby function as a first positioning member for positioning the plugs 2 in their thickness direction, like the second embodiment.

In this manner, according to the optical devices of the embodiments described above, the cut sections 21 are provided in the plug 2 near its side surfaces at a step lower than the center of the plug 2, and the first housing member 15 or the like as a first positioning member is formed in a manner to abut against the cut sections 21 and expose the higher protruded section 20. By this, compared to the case that uses a structure to surround a plug, the height of the plug in its thickness direction can be considerably reduced, and the optical device can be made thinner.

The connection structures of the optical devices in accordance with the embodiments described above can be implemented and used in a variety of optical devices such as optical communications apparatuses (optical transceivers), photoelectric mix mounted circuit substrates, and the like.

Figure 9:
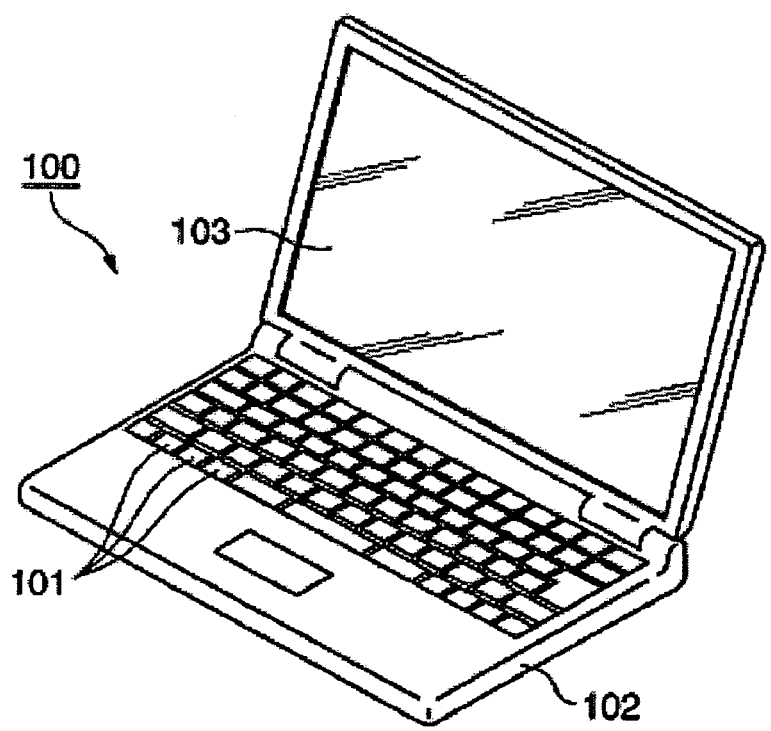
FIG. 9 is a perspective view showing a structure of one example of an electronic apparatus.

FIG. 9 is a perspective view showing a structure of a personal computer that is one example of electronic apparatuses equipped with an optical communications device formed with an optical device in accordance with the present invention. A notebook type (thin) personal computer 100 shown in FIG. 9 is equipped with a main body section 102 having a keyboard 101, and a display panel 103. The optical device or the like in accordance with the present embodiment is included in the main body section 102 of the personal computer 100 shown in FIG. 9, and used for performing data communications between the personal computer 100 and external devices. Further, the optical device or the like in accordance with the present embodiment may also be used for performing data communications between units within the main body section 102 of the personal computer 100 (for example, between the disk device and the mother board).

It is noted that the present invention is not limited to the contents of the embodiments described above, and various changes can be made within the scope of the subject matter of the present invention.

For example, in the embodiments described above, the edge section of the opening of the upper housing member 15 and its neighboring area concurrently function as a first positioning member, but they may be separately structured.

In the embodiments described above, an optical fiber is described as one example of an optical transmission medium, but without being limited this, an optical waveguide or the like may be used as an optical transmission medium.

In the embodiments described above, the reflection section 17 is formed in one piece with the optical block 12 (or the optical/guide block 40), but they do not need to be formed in such a manner, and the two can be disposed independently from each other.

In the embodiments described above, a BGA package is described as one example of a method for mounting an optical device on a circuit substrate of an external apparatus or the like. However, another mounting method, such as, for example, DIP (dual inline package), SOP (small outline package) or the like can be used.

In the embodiments described above, the lens 18 is formed in one piece with the optical block 12, but the lens 18 can be provided as a single independent component. Similarly, the lens 22 may not be formed in one piece with the plug 2.

What is claimed is:

1. A connection structure for an optical device including a plug provided at one end of an optical transmission medium wherein the plug is attached to a receptacle to thereby achieve an optical coupling between the one end of the optical transmission medium and a specified optical element, the connection structure for an optical device wherein:

the plug is equipped with a protruded section extending near a center and along a longitudinal direction of the optical transmission medium, and cut sections provided on both sides of the protruded section, and the receptacle is equipped with a substrate having one surface side on which the plug is mounted, a first positioning member that is provided on the one surface side of the substrate, exposes the protruded section and abuts against the cut sections of the plug for positioning the plug in a thickness direction thereof, and a second positioning member that is provided on the one surface side of the substrate, and abuts against side sections of the plug for positioning the plug in a direction orthogonal to the thickness direction of the plug and the longitudinal direction of the optical transmission medium, respectively.

2. A connection structure for an optical device according to claim 1, wherein the plug supports the one end of the optical transmission medium within a thickness range thereof including the protruded section.

3. A connection structure for an optical device according to claim 1, wherein the first positioning member of the receptacle is formed from a plate member provided to cover the cut sections.

4. A connection structure for an optical device according to claim 3, wherein the plate member is formed from an elastic body and causes a force that pushes the plug in the thickness direction thereof.

5. A connection structure for an optical device according to claim 1, wherein the receptacle includes a housing member having an opening that exposes the protruded section of the plug, wherein an edge section of the opening and a neighboring section thereof of the housing member concurrently serve as the first positioning member.

6. A connection structure for an optical device according to claim 1, wherein the second positioning member has an abutting surface against the side sections of the plug, and has a thickness generally identical with the plug, and the first positioning member is formed in one piece with the second positioning member as a protruded section disposed on an upper side of the abutting surface of the second positioning member.

7. A connection structure for an optical device according to claim 1, wherein the receptacle is provided on the one surface side of the substrate, and is further equipped with a reflection section that changes a traveling path of an optical signal outgoing from one end of the optical transmission medium by about 90 degrees to be conducted to the optical element, or that changes a traveling path of an optical signal outgoing from the optical element by about 90 degrees to be conducted to the one end of the optical transmission medium.

8. A connection structure for an optical device according to claim 7, wherein the substrate of the receptacle has transparency, and the optical element is disposed on another surface side of the substrate, wherein
the optical signal travels from the reflection section, passing through the substrate, to the optical element, or travels from the optical element, passing through the substrate, to the reflection section.

9. A connection structure for an optical device according to claim 7, further comprising a third positioning member that has transparency, and abuts against a tip section of the plug to position the plug in the longitudinal direction of the optical transmission medium, wherein
the reflection section is formed in one piece with the third positioning member by cutting a portion of the third positioning member.

10. A connection structure for an optical device according to claim 1, wherein the optical element is an optical device that emits the optical signal, or outputs an electrical signal according to an intensity of the optical signal that enters.

11. A receptacle that is provided at one end of an optical transmission medium and is attached to an optical plug equipped with a protruded section extending near a center and along a longitudinal direction of the optical transmission medium and cut sections provided on both sides of the protruded section, respectively, and is used for achieving together with the optical plug an optical coupling between one end of the optical transmission medium and a predetermined optical element, the receptacle comprising:
a substrate having one surface side on which the plug is mounted;
a first positioning member that is provided on the one surface side of the substrate, exposes the protruded section and abuts against the cut sections of the plug for positioning the plug in a thickness direction thereof, and
a second positioning member that is provided on the one surface side of the substrate, and abuts against side sections of the plug for positioning the plug in a direction orthogonal to the thickness direction of the plug and the longitudinal direction of the optical transmission medium, respectively.

12. An optical device comprising the connection structure for an optical device according to claim 1.

13. An electronic device equipped with the optical device according to claim 12.

14. A connection structure for an optical device according to claim 1,
the first positioning member having a U-shape, two arms of the U-shape abut, in parallel, the cut sections, a space between the two arms exposing the protruded section.

* * * * *